United States Patent
Schwartz

(10) Patent No.: US 11,928,919 B2
(45) Date of Patent: Mar. 12, 2024

(54) NODAL NETWORKS FOR CASINOS AND THE LIKE

(71) Applicant: Pavilion Payments Gaming Services, Inc., Las Vegas, NV (US)

(72) Inventor: Andrew J. Schwartz, Las Vegas, NV (US)

(73) Assignee: Pavilion Payments Gaming Services, Inc., Las Vegas, NV (US)

( * ) Notice: Subject to any disclaimer, the term of this patent is extended or adjusted under 35 U.S.C. 154(b) by 575 days.

(21) Appl. No.: 17/063,647

(22) Filed: Oct. 5, 2020

(65) Prior Publication Data

US 2021/0110645 A1 Apr. 15, 2021

Related U.S. Application Data

(60) Provisional application No. 62/913,827, filed on Oct. 11, 2019.

(51) Int. Cl.
*G07F 17/32* (2006.01)
*H04L 67/1021* (2022.01)
*H04W 4/80* (2018.01)

(52) U.S. Cl.
CPC ...... *G07F 17/3223* (2013.01); *H04L 67/1021* (2013.01); *H04W 4/80* (2018.02); *G07F 17/3225* (2013.01)

(58) Field of Classification Search
CPC .......................... G07F 17/3223; G07F 17/3225
See application file for complete search history.

(56) References Cited

U.S. PATENT DOCUMENTS

| | | | |
|---|---|---|---|
| 6,276,608 B1 * | 8/2001 | Cockayne | G06K 19/07749 235/492 |
| 7,976,386 B2 * | 7/2011 | Tran | A63F 13/335 463/40 |
| 8,070,604 B2 * | 12/2011 | Amaitis | G07F 17/32 463/40 |
| 8,282,490 B2 * | 10/2012 | Arezina | G07F 17/3237 463/40 |
| 8,323,102 B2 * | 12/2012 | Lutnick | G07F 17/3237 463/29 |

(Continued)

FOREIGN PATENT DOCUMENTS

WO  WO-03027970 A2 *  4/2003  ............. G07F 17/32

*Primary Examiner* — Steven J Hylinski
(74) *Attorney, Agent, or Firm* — Mendelsohn Dunleavy, P.C.; Steve Mendelsohn

(57) ABSTRACT

A casino having a nodal network of wireless transceivers. Each bank of gaming machines has a transceiver within wireless communication range of at least one other transceiver. A casino patron uses a casino app running on a mobile device to communicate with the external network cloud via the nodal network from any location within the casino at which the mobile device is within wireless communication range of a connected transceiver. The mobile device transmits to the connected transceiver an outgoing message that is propagated wirelessly through the nodal network to the external network cloud via a terminal transceiver. The mobile device receives from the connected transceiver an incoming message that has been transmitted from the external network cloud to the terminal transceiver and then propagated wirelessly through the nodal network to the connected transceiver.

15 Claims, 4 Drawing Sheets

(56) References Cited

U.S. PATENT DOCUMENTS

| | | | | |
|---|---|---|---|---|
| 8,397,985 | B2* | 3/2013 | Alderucci | H04L 63/105 |
| | | | | 235/380 |
| 8,403,214 | B2* | 3/2013 | Alderucci | G06F 21/32 |
| | | | | 235/382 |
| 2003/0064805 | A1* | 4/2003 | Wells | G07F 17/3206 |
| | | | | 463/16 |
| 2005/0192099 | A1* | 9/2005 | Nguyen | G07F 17/3232 |
| | | | | 463/42 |
| 2006/0058102 | A1* | 3/2006 | Nguyen | G07F 17/323 |
| | | | | 463/39 |
| 2006/0189382 | A1* | 8/2006 | Muir | G07F 17/32 |
| | | | | 463/29 |
| 2007/0191108 | A1* | 8/2007 | Brunet De Courssou | |
| | | | | G07F 17/32 |
| | | | | 463/42 |
| 2007/0191109 | A1* | 8/2007 | Crowder | A63F 9/24 |
| | | | | 463/42 |
| 2008/0076572 | A1* | 3/2008 | Nguyen | G07F 17/3237 |
| | | | | 463/42 |
| 2008/0293494 | A1* | 11/2008 | Adiraju | G07F 17/3223 |
| | | | | 463/43 |
| 2008/0300046 | A1* | 12/2008 | Gagner | G07F 17/32 |
| | | | | 463/25 |
| 2009/0124373 | A1* | 5/2009 | Acres | G07F 17/32 |
| | | | | 463/25 |
| 2011/0130197 | A1* | 6/2011 | Bytnar | G07F 17/3227 |
| | | | | 463/25 |
| 2012/0015735 | A1* | 1/2012 | Abouchar | G07F 17/3237 |
| | | | | 463/42 |
| 2013/0130777 | A1* | 5/2013 | Lemay | G06F 3/1454 |
| | | | | 463/25 |
| 2014/0364203 | A1* | 12/2014 | Nelson | G06Q 20/322 |
| | | | | 463/31 |

* cited by examiner

NODAL NETWORKS FOR CASINOS AND THE LIKE

CROSS-REFERENCE TO RELATED APPLICATIONS

This application claims the benefit of the filing date of U.S. provisional application No. 62/913,827, filed on Oct. 11, 2019, the teachings of which are incorporated herein by reference in their entirety. The subject matter of this disclosure is related to the subject matter of U.S. patent application Ser. No. 16/190,224 ("the '224 application"), the teachings of which are incorporated herein by reference in their entirety.

BACKGROUND

Field of the Disclosure

The present invention relates to computer networks for casinos and other gaming enterprises.

Description of the Related Art

This section introduces aspects that may help facilitate a better understanding of the disclosure. Accordingly, the statements of this section are to be read in this light and are not to be understood as admissions about what is prior art or what is not prior art.

A conventional casino has electronic gaming machines, such as (without limitation) slot machines and poker machines, that are configured in a distributed casino computer network that also includes, among other network nodes, casino network servers that coordinate and control the operations of the various gaming machines.

The '224 application describes technology in which a casino patron uses a casino application (aka app) that runs on a mobile device (e.g., the patron's cell phone or other suitable wireless device) and which enables the patron to use the mobile device to communicate with various nodes of the casino computer network using conventional cellular communication links such as broadband or wifi.

FIG. 1, which is a replica of FIG. 6 of the '224 application, shows a symbolic diagram representing a distributed computer network 600 for a casino that enables the use of a mobile device 650 running a casino app that supports gaming at the casino. Among other details described in the '224 application, FIG. 1 shows the mobile device 650 wirelessly communicating with a BLE (Bluetooth Low Energy) device 642 that is part of an electronic gaming machine 640. FIG. 1 also shows the mobile device 650 wirelessly communicating with a communication network cloud 602 via a suitable broadband or wifi connection that enables the mobile device 650 to communicate with other nodes of the gaming system 600, including casino network servers, such as a ticket server 610 and a transaction server 620.

Unfortunately, some existing casino computer networks do not support broadband or wifi communication links and, even for those casino computer networks that do support such communication links, there may be situations when those links are not available.

SUMMARY

Problems in the prior art are addressed in accordance with the principles of the present disclosure by a casino that is provisioned with a nodal network that supports wireless communications with cell phones and other suitable wireless devices running a casino app that supports gaming at the casino. In certain implementations, the nodal network is a Bluetooth nodal network that conforms to a Bluetooth communication protocol. Those skilled in the art will understand that other implementations may be based on other suitable wireless communication protocols.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 2:
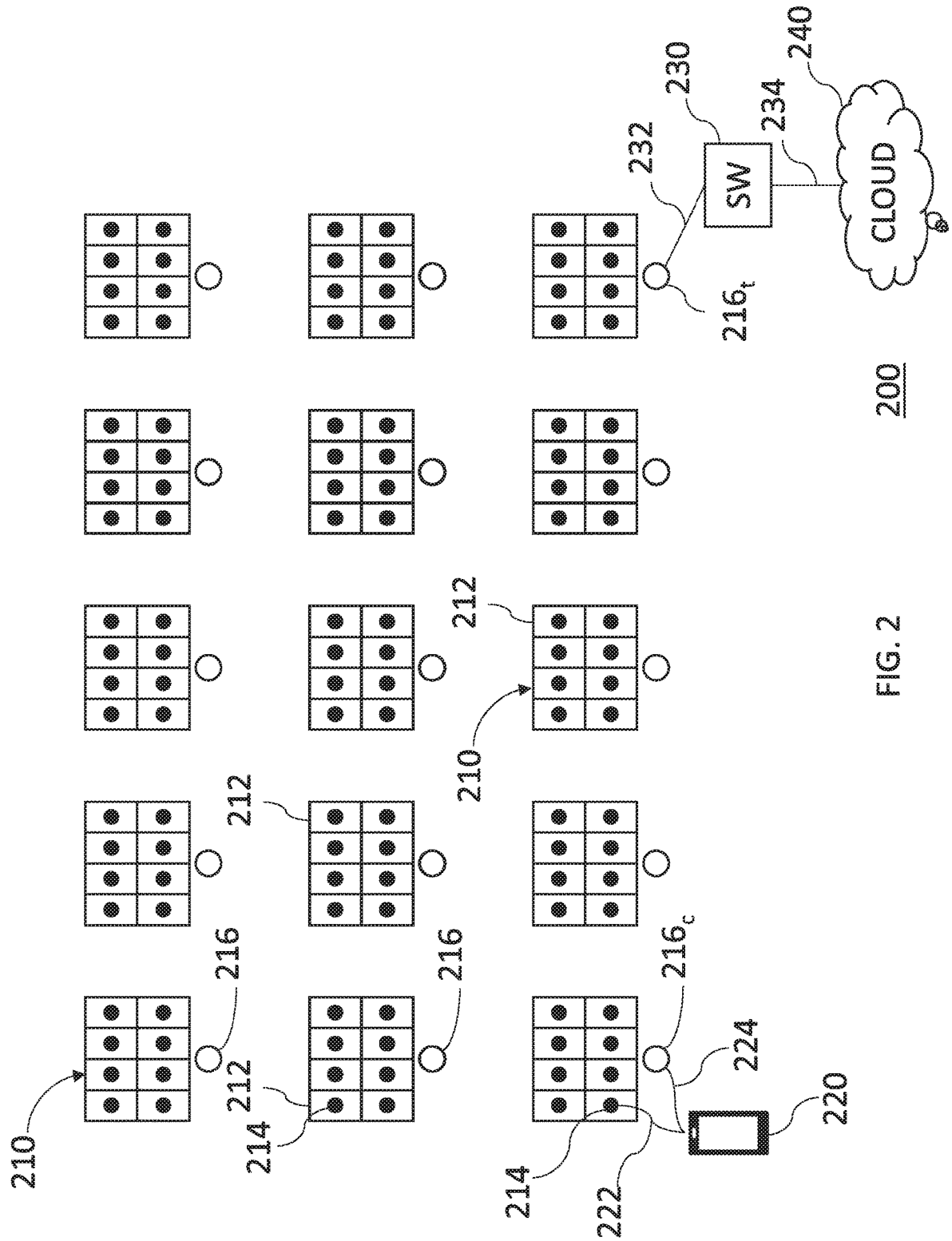
FIG. 2 is a block diagram of a portion of a casino having a Bluetooth nodal network, according to one possible embodiment of the disclosure.

FIG. 2 is a block diagram of a portion of a casino 200 having a Bluetooth nodal network, according to one possible embodiment of the disclosure. As represented in FIG. 2, the casino 200 has an array of banks 210, each having eight gaming machines 212, where each gaming machine 212 is provisioned with a BLE (Bluetooth Low Energy) transceiver 214, and each bank 210 is provisioned with a Bluetooth transceiver 216 that forms a node of the Bluetooth nodal network. Also depicted in FIG. 2 is a patron's mobile device 220 that runs a casino app that enables the mobile device to communicate with the BLE transceiver 214 of a gaming machine 212 via a BLE protocol link 222 and with the Bluetooth transceiver 216 of the corresponding bank 210 via a Bluetooth protocol link 224. The '224 application provides further description of the communications between the mobile device 220 and the BLE transceiver 214 via the BLE protocol link 222.

Those skilled in the art will understand that the typical range for BLE communications is about 30 inches, while the typical range for Bluetooth communications is about 30 meters. As such, casino 200 is configured such that each Bluetooth transceiver 216 is within 30 meters of at least one other Bluetooth transceiver 216. Those skilled in the art will understand that, according to the Bluetooth protocol, a mobile device, such as the mobile device 220 of FIG. 2, establishes a wireless communication session (i.e., a Bluetooth connection) with a particular Bluetooth transceiver 216, where the Bluetooth connection enables the mobile device 220 to transmit and receive wireless messages with only that particular connected Bluetooth transceiver 216 during that communication session. As such, even though other Bluetooth transceivers 216 may be close enough to receive those wireless messages, those other Bluetooth transceivers 216 will ignore those messages. Note further that each Bluetooth transceiver 216 may establish individual wireless communication sessions with one or more specific or designated other Bluetooth transceivers 216.

Also shown in FIG. 2 is an external communication network cloud 240 that is hardwired via an Ethernet switch 230 and Ethernet links 232 and 234 to a particular Bluetooth transceiver in the Bluetooth nodal network, which particular Bluetooth transceiver is referred to herein as "the terminal Bluetooth transceiver $216_t$," while each other, non-hardwired Bluetooth transceiver is referred to herein as a "non-terminal Bluetooth transceiver 216." The term "connected Bluetooth transceiver $216_c$" is used to refer to the Bluetooth transceiver that has the wireless communication session with the mobile device 220. The term "Bluetooth transceiver 216" is used to refer generally to any of the Bluetooth transceivers in the nodal network. Although not shown in FIG. 2, the communication network cloud 240 supports wired and/or wireless communication with other nodes of the casino computer network such as those shown in FIG. 4 described below. Although the communication links 232 and 234 to the communication network cloud 240 in FIG. 2 are hardwired Ethernet links, in other embodiments, one or both of those links may be other suitable types of hardwired links and/or suitable types of wireless links, such as (without limitation) broadband or wifi.

In certain implementations, each Bluetooth transceiver 216 in the casino 200 is capable of supporting three different types of Bluetooth messages: (i) messages to/from mobile devices, such as mobile device 220, (ii) messages to/from other Bluetooth transceivers 216, and (iii) messages to/from the communication network cloud 240, where each message contains information that identifies the message type. Note that, in the casino 200 of FIG. 2, although each non-terminal Bluetooth transceiver 216 is capable of communicating with the communication network cloud 240, only the terminal Bluetooth transceiver $216_t$ is actually configured to do so.

A message transmitted from a mobile device to a Bluetooth transceiver 216 may be an outgoing request message being transmitted to a server (or other appropriate node) of the casino computer network, and a message transmitted from the communication network cloud 240 to the terminal Bluetooth transceiver $216_t$ may be an incoming reply message from the server in response to a previous request message from a mobile device. Each mobile device is capable of transmitting request messages and receiving reply messages, the communication network cloud 240 is capable of receiving request messages and transmitting reply messages, and each Bluetooth transceiver 216 is capable of receiving and transmitting both request messages and reply messages.

Each request or reply message is associated with a thread ID number that identifies the communication thread to which the message belongs. Each request message from a mobile device and its corresponding reply message from the communication network cloud 240 will be assigned the same thread ID number. In some implementations, the casino app running on a mobile device assigns the thread ID number when the mobile device initiates the thread by transmitting a request message to a particular connected Bluetooth transceiver $216_c$ with which the mobile device has an existing Bluetooth communication session. In other implementations, the connected Bluetooth transceiver $216_c$ that receives the request message from the mobile device 220 assigns the thread ID number. The following description assumes that the Bluetooth transceivers 216 assign thread ID numbers.

Each Bluetooth transceiver 216 maintains a list of previously established threads that identifies, for each thread, the thread ID number and whether the thread is an existing thread or a terminated thread. In some implementations, the list also identifies a date/timestamp for each thread, where the Bluetooth transceiver 216 will (i) convert an existing thread into a terminated thread if the existing thread is older than a first specified threshold duration and/or (ii) delete a terminated thread from the list if the terminated thread is older than a second specified threshold duration.

The Bluetooth transceivers 216 are configured to operate as follows:

Whenever a non-terminal Bluetooth transceiver 216 receives a request message from a mobile device, the non-terminal Bluetooth transceiver 216 assigns a thread ID number to that request message, saves the thread ID number as an existing thread in its list of threads, identifies itself as the node that started that thread, and re-broadcasts the request message with the thread ID number;

Whenever the terminal Bluetooth transceiver $216_t$ receives a request message from a mobile device, the terminal Bluetooth transceiver $216t$ assigns a thread ID number to that request message, saves the thread ID number as an existing thread in its list of threads, identifies itself as the node that started that thread, and transmits the request message as an Ethernet request message via the switch 230 to the communication network cloud 240;

Whenever a non-terminal Bluetooth transceiver 216 receives a request message from another non-terminal Bluetooth transceiver 216, the receiving non-terminal Bluetooth transceiver 216 identifies the thread ID number and determines whether the thread ID number is already on its list of threads and, if so, whether it is an existing thread or a terminated thread. If the thread ID number is not on its list, then the non-terminal Bluetooth transceiver 216 adds the thread ID number to the list as an existing thread and re-broadcasts the request message. If the thread ID number is already on its list as an existing thread, then the non-terminal Bluetooth transceiver 216 simply re-broadcasts the request message. If the thread ID number is already on its list as a terminated thread, then the non-terminal Bluetooth transceiver 216 does nothing;

Whenever the terminal Bluetooth transceiver 216$_t$ receives a request message from a non-terminal Bluetooth transceiver 216, the terminal Bluetooth transceiver 216$_t$ identifies the thread ID number and determines whether the thread ID number is already on its list of threads and, if so, whether it is an existing thread or a terminated thread. If the thread ID number is not on its list, then the terminal Bluetooth transceiver 216$_t$ adds the thread ID number to the list as an existing thread and transmits the request message as an Ethernet request message via the switch 230 to the communication network cloud 240. If the thread ID number is already on its list as an existing thread, then the terminal Bluetooth transceiver 216$_t$ simply transmits the request message as an Ethernet request message via the switch 230 to the communication network cloud 240. If the thread ID number is already on its list as a terminated thread, then the terminal Bluetooth transceiver 216$_t$ does nothing;

Whenever the terminal Bluetooth transceiver 216$_t$ receives an Ethernet reply message from the communication network cloud 240 in response to a previous Ethernet request message, the terminal Bluetooth transceiver 216$_t$ broadcasts a corresponding Bluetooth reply message containing the thread ID number and then updates its list of threads to indicate that that thread is now terminated.

Whenever a non-terminal Bluetooth transceiver 216 receives a reply message from another Bluetooth transceiver 216, the receiving non-terminal Bluetooth transceiver 216 identifies the thread ID number and determines (i) whether the thread ID number is already on its list of threads, (ii) if so, whether it is an existing thread or a terminated thread, and (iii) if it is an existing thread, whether it is the node that started that existing thread. If the thread ID number is not on its list or if it is a terminated thread, then the non-terminal Bluetooth transceiver 216 does nothing. If the thread ID number is on its list as an existing thread, but the existing thread was not started by the non-terminal Bluetooth transceiver 216, then the non-terminal Bluetooth transceiver 216 re-broadcasts the reply message and then updates its list of threads to indicate that that thread is now terminated. If the thread ID number is on its list as an existing thread and if the existing thread was started by the non-terminal Bluetooth transceiver 216, then the non-terminal Bluetooth transceiver 216 transmits the reply message to the mobile device (e.g., until the mobile device acknowledges receipt) and then updates its list of threads to indicate that that thread is now terminated.

In some implementations, each Bluetooth transceiver 216 maintains a cache of its most recently received reply messages in case a mobile device moves from one Bluetooth transceiver 216 to a different Bluetooth transceiver 216 between the time that the mobile device transmitted a request message and the time that the corresponding reply message is available. If and when a mobile device establishes a new Bluetooth connection with a new connected Bluetooth transceiver 216$_c$ while the mobile device is still waiting for a reply message in response to its previously transmitted request message, then the mobile device identifies the corresponding thread ID number to the new connected Bluetooth transceiver 216$_c$, which should be able to retrieve the corresponding reply message from its cache and transmit that reply message to the mobile device.

Based on the above operating rules, whenever a mobile device has a request message to transmit to a casino server, the mobile device establishes a Bluetooth connection with one of the Bluetooth transceivers 216 using conventional Bluetooth processing and then transmits the request message to the connected Bluetooth transceiver 216$_c$. If the connected Bluetooth transceiver is a non-terminal Bluetooth transceiver 216, then the non-terminal Bluetooth transceiver 216 broadcasts the request message, and each receiving non-terminal Bluetooth transceiver 216 re-broadcasts the request message. As the request message is broadcast and re-broadcast within the nodal network, the request message will eventually reach the terminal Bluetooth transceiver 216$_t$, which will transmit the request message via the network cloud 240 to the network server, which will then process the request message and transmit a corresponding reply message via the network cloud 240 to the terminal Bluetooth transceiver 216$_t$. Assuming that the terminal Bluetooth transceiver 216$_t$ is not the connected Bluetooth transceiver 216$_c$, the terminal Bluetooth transceiver 216$_t$ will broadcast the reply message, and one or more non-terminal Bluetooth transceivers 216 will receive and re-broadcast that reply message until, eventually, as the reply message is broadcast and re-broadcast within the nodal network, the reply message will reach the connected Bluetooth transceiver 216$_c$, which will transmit the reply message to the mobile device.

Figure 3:
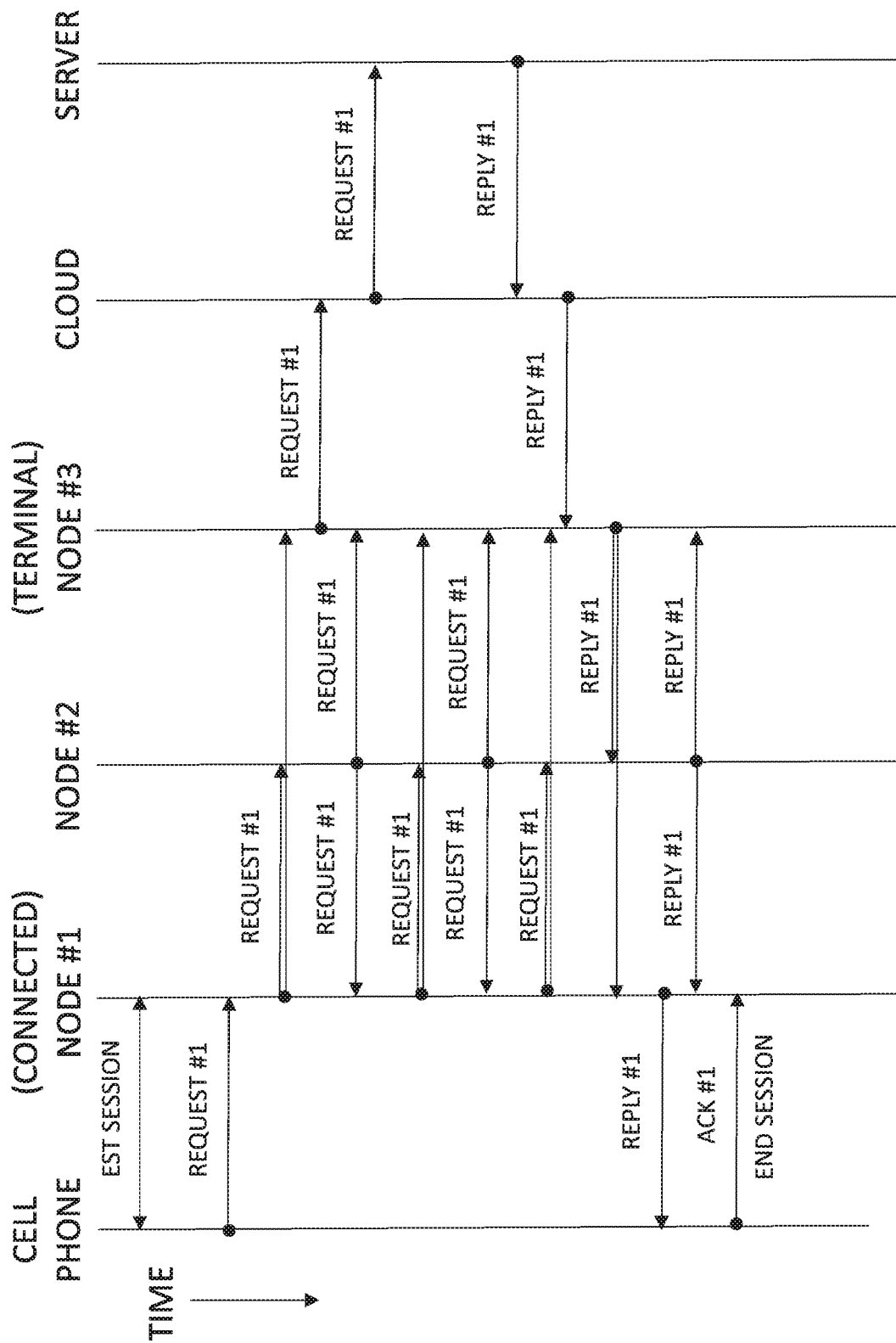
FIG. 3 is a diagram representing the flow of messages within a simple example implementation of the casino of FIG. 2.

FIG. 3 is a diagram representing the flow of messages within a simple example implementation of the casino 200 of FIG. 2 consisting of only two non-terminal Bluetooth transceivers 216 (referred to in FIG. 3 as Nodes #1 and #2) in addition to the terminal Bluetooth transceiver 216$_t$ (referred to in FIG. 3 as Node #3), where time flows from top to bottom.

As represented in FIG. 3, processing begins with the mobile device establishing a Bluetooth communication session with Node #1 (i.e., the connected Bluetooth transceiver 216$_c$). The mobile device then transmits a request message (Request #1) to connected Node #1, which broadcasts Request #1. That broadcast of Request #1 is received by Nodes #2 and #3. Terminal Node #3 transmits Request #1 to the cloud, which transmits Request #1 to the server, which processes Request #1 and transmits Reply #1 to the cloud, which transmits Reply #1 to Node #3. In the meantime, Nodes #1 and #2 have continued to receive and re-broadcast Request #1.

After receiving Reply #1, Node #3 broadcasts Reply #1, which is received by Nodes #2 and #3. After receiving Reply #1, Node #3 transmits Reply #1 to the mobile device, which transmits an acknowledgement message (Ack #1) back to Node #3 before ending the Bluetooth communication session. Note that Node #2 re-broadcasts Reply #1 one time before terminating that thread.

In this way, any mobile phone having a request message for a casino server can use the Bluetooth nodal network of FIG. 2 to transmit that request message to the casino server and receive the corresponding reply message from the casino server. In some embodiments, in which the casino network supports broadband and wifi communications in addition to the Bluetooth nodal network, the casino app can be configured to prioritize the different communication protocols. For example, the casino app can be configured to use the Bluetooth nodal network whenever it is available. If the Bluetooth nodal network is not available (e.g., because the mobile device is too far away from every Bluetooth transceiver 216), then the casino app will attempt to use the broadband network, and, if the broadband network is not available, then the casino app will attempt to use the wifi network.

As described above, whenever a Bluetooth transceiver 216 receives a reply message, the Bluetooth transceiver 216 broadcasts the reply message one time and then terminates the corresponding thread. In other implementations, each Bluetooth transceiver 216 continues to broadcast the reply message until the Bluetooth transceiver 216 receives a specific terminate-thread message identifying that the corresponding thread is to be terminated. In these implementations, the connected non-terminal Bluetooth transceiver $216_c$ transmits the initial terminate-thread message after receiving acknowledgement of the reply message from the mobile device, and each Bluetooth transceiver 216 that receives that terminate-thread message re-broadcasts the terminate-thread message a specified number of times (e.g., one time) before terminating the thread.

In some implementations, each Bluetooth transceiver 216 re-broadcasts a message one time for every time that Bluetooth transceiver 216 receives that message. In other implementations, each Bluetooth transceiver 216 continues to periodically re-broadcast any received message until that Bluetooth transceiver 216 is explicitly instructed to terminate those transmissions. For example, a non-terminal Bluetooth transceiver 216 will continue to periodically transmit a request message until the non-terminal Bluetooth transceiver 216 receives a corresponding reply message or a special message explicitly instructing the non-terminal Bluetooth transceiver 216 to terminate that thread. Similarly, a Bluetooth transceiver 216 will continue to periodically transmit a reply message until the Bluetooth transceiver 216 receives a special message explicitly instructing the Bluetooth transceiver 216 to terminate that thread.

Figure 1:
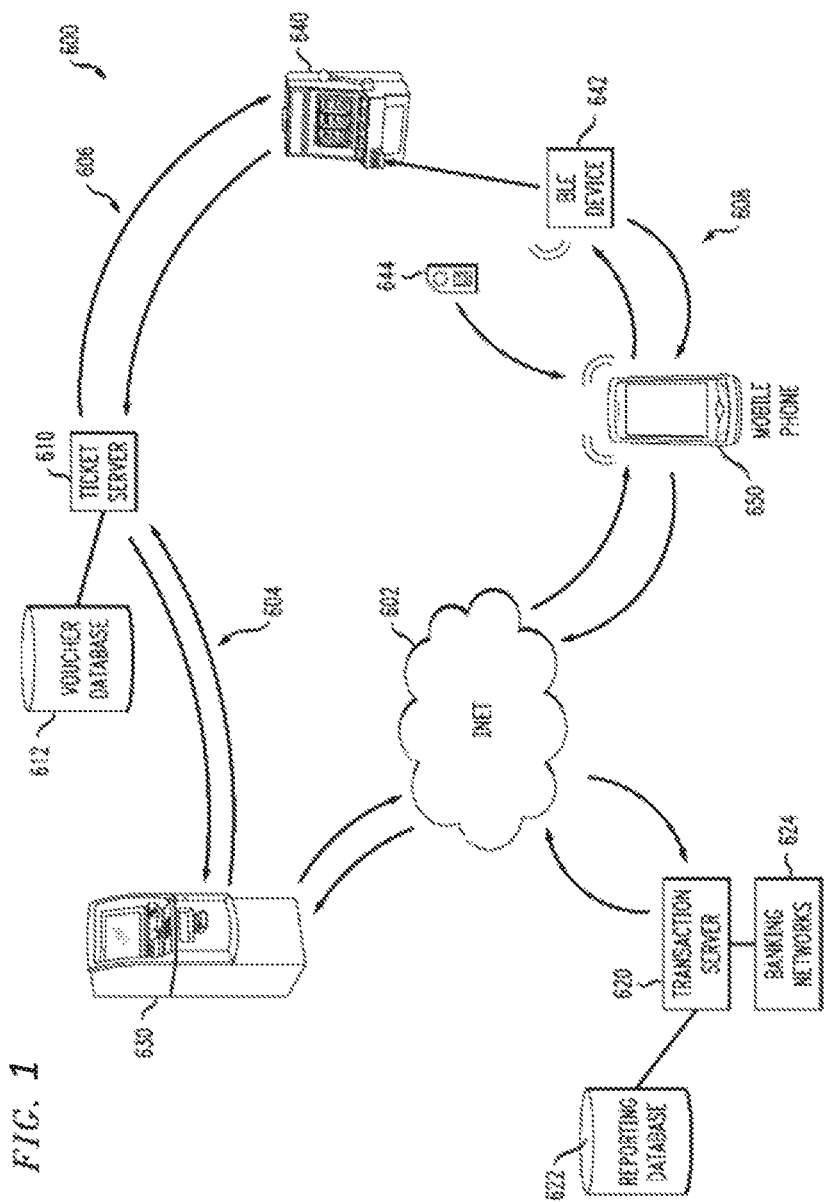
FIG. 1 shows a symbolic diagram representing a distributed computer network for a casino that enables the use of a mobile device running a casino app that supports gaming at the casino.
Figure 4:
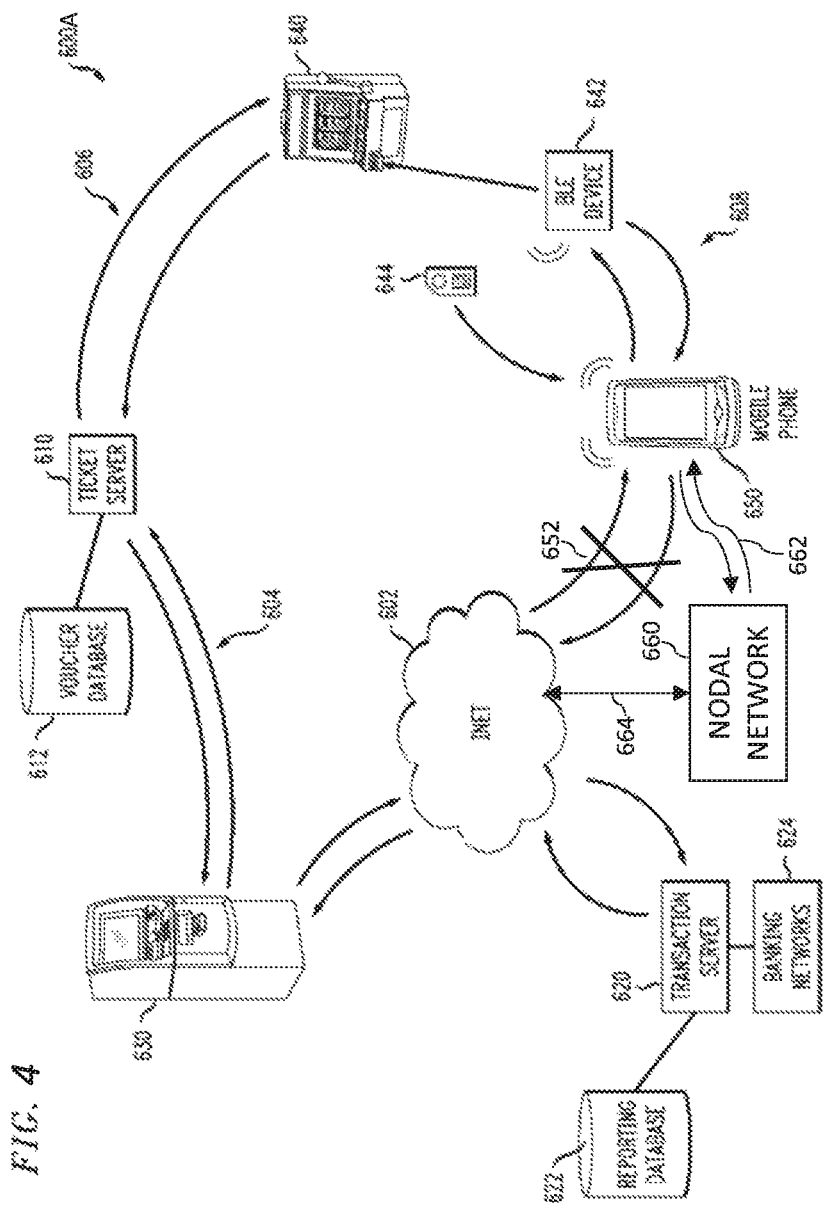
FIG. 4 is a symbolic diagram representing a distributed computer network for a casino having a Bluetooth nodal network similar to the Bluetooth nodal network of FIG. 2 that enables the use of a mobile device running a casino app that supports gaming at the casino.

FIG. 4 is a symbolic diagram representing a distributed computer network 600A for a casino having a Bluetooth nodal network 660 similar to the Bluetooth nodal network of FIG. 2 that enables the use of a mobile device 650 running a casino app that supports gaming at the casino. FIG. 4 represents a situation in which the broadband/wifi communication link 652 is not available, and the mobile device 650 instead communicates with the cloud 602 via the nodal network 660. In particular, the mobile device 650 communicates with the nodal network 660 via the Bluetooth connection 662, and the nodal network 660 communicates with the cloud 602 via the connection 664. Note that the Ethernet switch 230 and the Ethernet links 232 and 234 of FIG. 2 correspond to the connection 664 of FIG. 4. All of the other elements in FIG. 4 are similar to the corresponding elements of FIG. 1. Note further that, in some implementations, the mobile device 650 can be configured to function as one of the Bluetooth transceivers 216 of FIG. 2 in the Bluetooth nodal network in addition to being the patron's mobile device 220.

As used in the claims, the term "casino" refers to any location having multiple gaming machines, including (without limitation) casinos, airports, train/bus stations, bars, restaurants, pools, and clubs.

In some embodiments, a casino (e.g., 200) comprises (i) a plurality of gaming machines (e.g., 212) arranged in banks (e.g., 210) of one or more gaming machines per bank and (ii) a nodal network of wireless transceivers (e.g., 216), each bank of gaming machines having a wireless transceiver. Each wireless transceiver is within wireless communication range of at least one other wireless transceiver in the nodal network; at least one wireless transceiver is a terminal transceiver (e.g., $216t$) configured to communicate with an external network cloud (e.g., 240); and a casino patron can use a casino app running on a mobile device (e.g., 220) to communicate with the external network cloud via the nodal network from any location within the casino at which the mobile device is within wireless communication range of a wireless transceiver in the nodal network, that wireless transceiver being a connected transceiver (e.g., $216c$). The mobile device transmits to the connected transceiver an outgoing message that is propagated wirelessly through the nodal network via zero, one, or more of the other wireless transceivers to the terminal transceiver and from the terminal transceiver to the external network cloud. The mobile device receives from the connected transceiver an incoming message that has been transmitted from the external network cloud to the terminal transceiver and then propagated wirelessly through the nodal network via zero, one, or more of the other wireless transceivers to the connected transceiver.

In at least some of the above embodiments, the mobile device functions as one of the wireless transceivers of the nodal network.

In at least some of the above embodiments, the mobile device communicates with the connected transceiver and each wireless transceiver communicates with at least one other wireless transceiver in the nodal network via a first communication protocol that does not require the mobile device to register with a communication server different from the connected transceiver in order to communicate with the connected transceiver via the first communication protocol.

In at least some of the above embodiments, at least one gaming machine has an other wireless interface (e.g., 214) with which the mobile device can communicate via an other communication protocol having a shorter range than the first communication protocol.

In at least some of the above embodiments, the first communication protocol is a Bluetooth protocol and the other communication protocol is a BLE protocol.

In at least some of the above embodiments, the terminal transceiver communicates with the external network cloud via a wired Ethernet connection.

In at least some of the above embodiments, when the connected transceiver receives the outgoing message directly from the mobile device, the connected transceiver assigns a thread ID number to the outgoing message, saves the thread ID number as an existing thread in its list of threads, identifies itself as a node that started the thread, and re-broadcasts the outgoing message with the thread ID number.

In at least some of the above embodiments, when the terminal transceiver receives the outgoing message directly from the mobile device, the terminal transceiver assigns a thread ID number to the outgoing message, saves the thread ID number as an existing thread in its list of threads, identifies itself as a node that started the thread, and transmits the outgoing message to the external network cloud.

In at least some of the above embodiments, when a non-terminal transceiver receives the outgoing message directly from another non-terminal transceiver, the receiving non-terminal transceiver identifies a thread ID number and determines whether the thread ID number is already on its list of threads and, if so, whether it is an existing thread or a terminated thread. If the non-terminal transceiver determines that the thread ID number is not on its list of threads, then the non-terminal transceiver adds the thread ID number to its list of threads as an existing thread and re-broadcasts the outgoing message; if the thread ID number is already on its list of threads as an existing thread, then the non-terminal transceiver re-broadcasts the outgoing message; and if the thread ID number is already on its list of threads as a terminated thread, then the non-terminal transceiver does not re-broadcast the outgoing message.

In at least some of the above embodiments, when the terminal transceiver receives the outgoing message directly from a non-terminal transceiver, the terminal transceiver identifies a thread ID number and determines whether the thread ID number is already on its list of threads and, if so, whether it is an existing thread or a terminated thread. If the thread ID number is not on its list of threads, then the terminal transceiver adds the thread ID number to the list of threads as an existing thread and transmits the outgoing message to the external network cloud; if the thread ID number is already on its list of threads as an existing thread, then the terminal transceiver transmits the outgoing message to the external network cloud; and if the thread ID number is already on its list of threads as a terminated thread, then the terminal transceiver not transmit the outgoing message to the external network cloud.

In at least some of the above embodiments, when the terminal transceiver receives the incoming message from the external network cloud in response to the outgoing message, the terminal transceiver broadcasts a corresponding incoming message containing a thread ID number and then updates its list of threads to indicate that the corresponding thread is now terminated.

In at least some of the above embodiments, when a non-terminal transceiver receives the incoming message from another wireless transceiver, the receiving non-terminal transceiver identifies a thread ID number and determines (i) whether the thread ID number is already on its list of threads, (ii) if so, whether it is an existing thread or a terminated thread, and (iii) if it is an existing thread, whether it is a node that started the existing thread. If the thread ID number is not on its list of threads or if it is a terminated thread, then the non-terminal transceiver does not re-broadcast the incoming message; if the thread ID number is on its list of threads as an existing thread, but the existing thread was not started by the non-terminal transceiver, then the non-terminal transceiver re-broadcasts the incoming message and then updates its list of threads to indicate that the thread is now terminated; and if the thread ID number is on its list of threads as an existing thread and if the existing thread was started by the non-terminal transceiver, then the non-terminal transceiver transmits the incoming message to the mobile device and then updates its list of threads to indicate that the thread is now terminated.

In at least some of the above embodiments, the external network cloud is configured to transmit the outgoing message to a server of the casino's computer network and receive the incoming message from the server of the casino's computer network.

In at least some of the above embodiments, the outgoing message is a request message, and the incoming message is a reply message corresponding to the request message.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A casino comprising:
   a plurality of gaming machines arranged in banks of one or more gaming machines per bank; and
   a nodal network of wireless transceivers, each bank of gaming machines having a wireless transceiver, wherein:
   each wireless transceiver is within wireless communication range of at least one other wireless transceiver in the nodal network;
   at least one wireless transceiver is a terminal transceiver configured to communicate with an external network cloud; and
   a casino patron can use a casino app running on a mobile device to communicate with the external network cloud via the nodal network from any location within the casino at which the mobile device is within wireless communication range of a wireless transceiver in the nodal network, that wireless transceiver being a connected transceiver, wherein:
   the mobile device transmits to the connected transceiver an outgoing message that is propagated wirelessly through the nodal network via zero, one, or more of the other wireless transceivers to the terminal transceiver and from the terminal transceiver to the external network cloud;
   when the connected transceiver receives the outgoing message directly from the mobile device, the connected transceiver assigns a thread ID number to the outgoing message, saves the thread ID number as an existing thread in its list of threads, identifies itself as a node that started the thread, and re-broadcasts the outgoing message with the thread ID number; and
   the mobile device receives from the connected transceiver an incoming message that has been transmitted from the external network cloud to the terminal transceiver and then propagated wirelessly through the nodal network via zero, one, or more of the other wireless transceivers to the connected transceiver.

2. The casino of claim 1, wherein the mobile device is-functions as one of the wireless transceivers of the nodal network.

3. The casino of claim 1, wherein the mobile device communicates with the connected transceiver and each wireless transceiver communicates with at least one other wireless transceiver in the nodal network via a first communication protocol that does not require the mobile device to register with a communication server different from the connected transceiver in order to communicate with the connected transceiver via the first communication protocol.

4. The casino of claim 3, wherein at least one gaming machine has an other wireless interface with which the mobile device can communicate via an other communication protocol having a shorter range than the first communication protocol.

5. The casino of claim 4, wherein the first communication protocol is a Bluetooth protocol and the other communication protocol is a BLE protocol.

6. The casino of claim 1, wherein the terminal transceiver communicates with the external network cloud via a wired Ethernet connection.

7. The casino of claim 1, wherein, when the terminal transceiver receives the outgoing message directly from the mobile device, the terminal transceiver assigns a thread ID number to the outgoing message, saves the thread ID number as an existing thread in its list of threads, identifies itself as a node that started the thread, and transmits the outgoing message to the external network cloud.

8. The casino of claim 1, wherein:
when a non-terminal transceiver receives the outgoing message directly from another non-terminal transceiver, the receiving non-terminal transceiver identifies a thread ID number and determines whether the thread ID number is already on its list of threads and, if so, whether it is an existing thread or a terminated thread;
if the non-terminal transceiver determines that the thread ID number is not on its list of threads, then the non-terminal transceiver adds the thread ID number to its list of threads as an existing thread and re-broadcasts the outgoing message;
if the thread ID number is already on its list of threads as an existing thread, then the non-terminal transceiver re-broadcasts the outgoing message; and
if the thread ID number is already on its list of threads as a terminated thread, then the non-terminal transceiver does not re-broadcast the outgoing message.

9. The casino of claim 1, wherein:
when the terminal transceiver receives the outgoing message directly from a non-terminal transceiver, the terminal transceiver identifies a thread ID number and determines whether the thread ID number is already on its list of threads and, if so, whether it is an existing thread or a terminated thread;
if the thread ID number is not on its list of threads, then the terminal transceiver adds the thread ID number to the list of threads as an existing thread and transmits the outgoing message to the external network cloud;
if the thread ID number is already on its list of threads as an existing thread, then the terminal transceiver transmits the outgoing message to the external network cloud; and
if the thread ID number is already on its list of threads as a terminated thread, then the terminal transceiver not transmit the outgoing message to the external network cloud.

10. The casino of claim 1, wherein, when the terminal transceiver receives the incoming message from the external network cloud in response to the outgoing message, the terminal transceiver broadcasts a corresponding incoming message containing a thread ID number and then updates its list of threads to indicate that the corresponding thread is now terminated.

11. The casino of claim 1, wherein:
when a non-terminal transceiver receives the incoming message from another wireless transceiver, the receiving non-terminal transceiver identifies a thread ID number and determines (i) whether the thread ID number is already on its list of threads, (ii) if so, whether it is an existing thread or a terminated thread, and (iii) if it is an existing thread, whether it is a node that started the existing thread;
if the thread ID number is not on its list of threads or if it is a terminated thread, then the non-terminal transceiver does not re-broadcast the incoming message;
if the thread ID number is on its list of threads as an existing thread, but the existing thread was not started by the non-terminal transceiver, then the non-terminal transceiver re-broadcasts the incoming message and then updates its list of threads to indicate that the thread is now terminated; and
if the thread ID number is on its list of threads as an existing thread and if the existing thread was started by the non-terminal transceiver, then the non-terminal transceiver transmits the incoming message to the mobile device and then updates its list of threads to indicate that the thread is now terminated.

12. The casino of claim 1, wherein the external network cloud is configured to transmit the outgoing message to a server of the casino's computer network and receive the incoming message from the server of the casino's computer network.

13. The casino of claim 1, wherein:
the outgoing message is a request message; and
the incoming message is a reply message corresponding to the request message.

14. A casino comprising:
a plurality of gaming machines arranged in banks of one or more gaming machines per bank; and
a nodal network of wireless transceivers, each bank of gaming machines having a wireless transceiver, wherein:
each wireless transceiver is within wireless communication range of at least one other wireless transceiver in the nodal network;
at least one wireless transceiver is a terminal transceiver configured to communicate with an external network cloud; and
a casino patron can use a casino app running on a mobile device to communicate with the external network cloud via the nodal network from any location within the casino at which the mobile device is within wireless communication range of a wireless transceiver in the nodal network, that wireless transceiver being a connected transceiver, wherein:
the mobile device transmits to the connected transceiver an outgoing message that is propagated wirelessly through the nodal network via zero, one, or more of the other wireless transceivers to the terminal transceiver and from the terminal transceiver to the external network cloud;

the mobile device receives from the connected transceiver an incoming message that has been transmitted from the external network cloud to the terminal transceiver and then propagated wirelessly through the nodal network via zero, one, or more of the other wireless transceivers to the connected transceiver;

when a non-terminal transceiver receives the outgoing message directly from another non-terminal transceiver, the receiving non-terminal transceiver identifies a thread ID number and determines whether the thread ID number is already on its list of threads and, if so, whether it is an existing thread or a terminated thread;

if the non-terminal transceiver determines that the thread ID number is not on its list of threads, then the non-terminal transceiver adds the thread ID number to its list of threads as an existing thread and re-broadcasts the outgoing message;

if the thread ID number is already on its list of threads as an existing thread, then the non-terminal transceiver re-broadcasts the outgoing message; and if the thread ID number is already on its list of threads as a terminated thread, then the non-terminal transceiver does not re-broadcast the outgoing message.

15. A casino comprising:

a plurality of gaming machines arranged in banks of one or more gaming machines per bank; and a nodal network of wireless transceivers, each bank of gaming machines having a wireless transceiver, wherein:

each wireless transceiver is within wireless communication range of at least one other wireless transceiver in the nodal network;

at least one wireless transceiver is a terminal transceiver configured to communicate with an external network cloud; and a casino patron can use a casino app running on a mobile device to communicate with the external network cloud via the nodal network from any location within the casino at which the mobile device is within wireless communication range of a wireless transceiver in the nodal network, that wireless transceiver being a connected transceiver, wherein:

the mobile device transmits to the connected transceiver an outgoing message that is propagated wirelessly through the nodal network via zero, one, or more of the other wireless transceivers to the terminal transceiver and from the terminal transceiver to the external network cloud;

the mobile device receives from the connected transceiver an incoming message that has been transmitted from the external network cloud to the terminal transceiver and then propagated wirelessly through the nodal network via zero, one, or more of the other wireless transceivers to the connected transceiver; and when the terminal transceiver receives the incoming message from the external network cloud in response to the outgoing message, the terminal transceiver broadcasts a corresponding incoming message containing a thread ID number and then updates its list of threads to indicate that the corresponding thread is now terminated.

* * * * *